May 24, 1955 H. B. FERGUSON 2,709,206
CONSTANT TIME DELAY BAND-PASS FILTER
Filed Jan. 31, 1951 4 Sheets-Sheet 1

Henry B. Ferguson Inventor
By W. O. J. Heilman Attorney

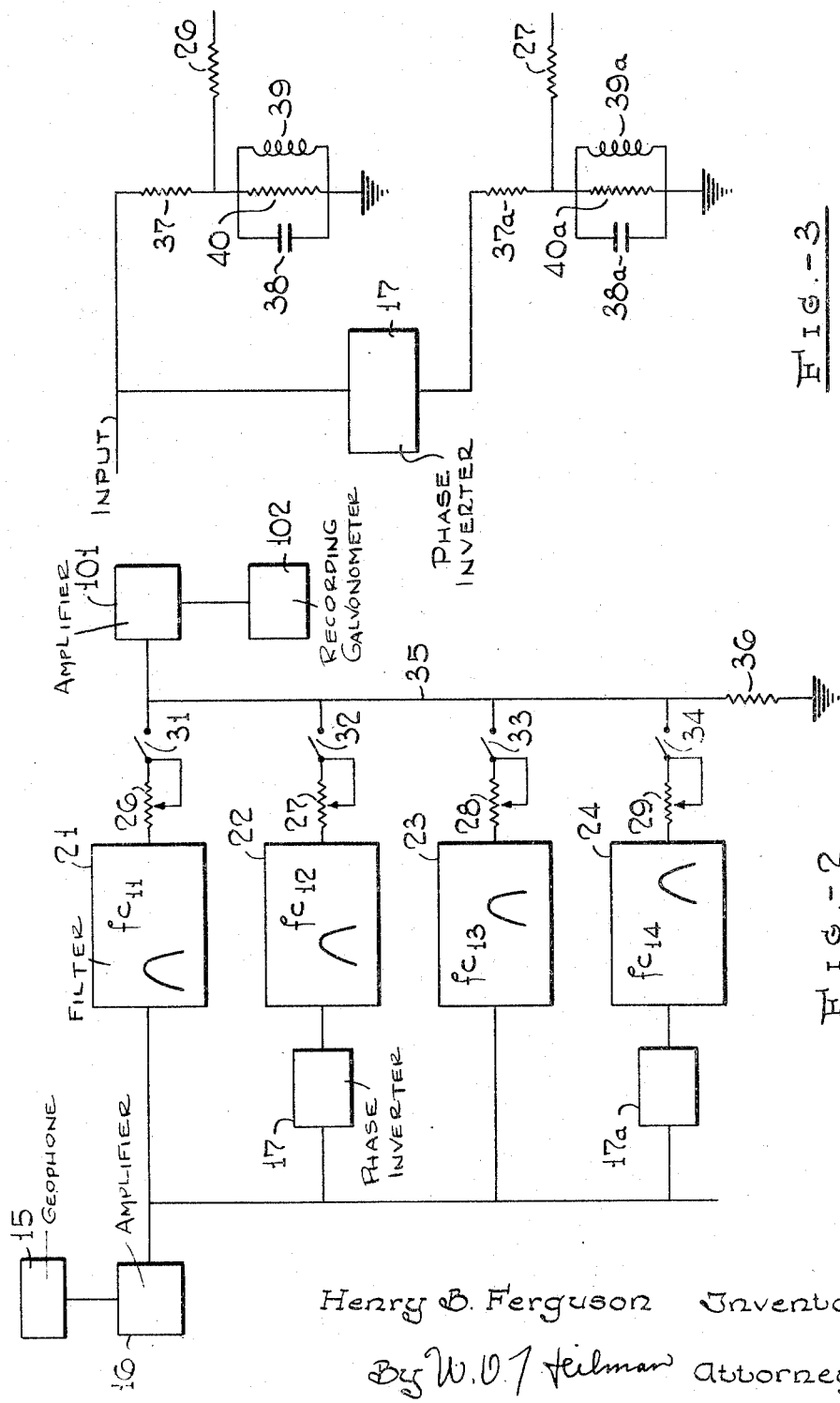

Henry B. Ferguson Inventor
By W. O. T Heilman Attorney

Henry B. Ferguson Inventor
By W. O. T Hilman Attorney

2,709,206

CONSTANT TIME DELAY BAND-PASS FILTER

Henry B. Ferguson, Tulsa, Okla., assignor to Esso Research and Engineering Company, a corporation of Delaware Application January 31, 1951, Serial No. 208,705

6 Claims. (Cl. 179—171)

This invention relates to an improved electronic circuit band-pass filter in which the bandwidth may be varied without materially affecting time delay characteristics. More particularly it relates to a constant time delay filter that is eminently suited for seismic recording equipment.

In many applications of electronic amplifier circuits wherein wave filter sections are employed it is necessary or advantageous to employ filters of variable bandwidth. One use of such a variable filter is in the amplifier circuit of a seismograph employed in seismic prospecting for oil or other mineral deposits, wherein an explosive charge is detonated in a shot hole and the motion of the earth from the resulting seismic disturbance is detected at a number of points spread out in a desired pattern from the shot hole, sensitive pickups or geophones being employed to translate the detected motion into electrical impulses which after suitable amplification are recorded on a seismograph. Conventionally, a seismograph record is obtained by means of a number of moving coil galvanometers each one of which has a mirror attached thereto, the galvanometers being arranged in a battery in connection with a source of light in such relation to a moving strip of sensitized paper or film that there will be recorded on the paper or film a plurality of wave forms or traces representative of the seismic waves that have been picked up by the individual geophones, suitably amplified, and fed to the galvanometers. The strip of paper or film is moved longitudinally at a substantially constant speed and is provided by well known means with suitable timing marks so that when the seismograph record, or seismogram, is later examined it is possible to determine the length of time required for the arrival of seismic waves at any particular point on the earth's surface either directly from the source or by reflection from underlying strata. From other data obtained in the area being studied, such as seismic wave velocities in the various earth layers, it is then possible to estimate the depths of the various reflecting substrata.

The amplifier circuits of the seismograph instruments used in seismic prospecting are commonly provided with a number of filter networks with provision for selecting those best suited for suppression of spurious signals arising in the particular locality being profiled. These latter signals include high frequency noises such as wind noise and low frequency noise such as what is commonly called "ground roll." When designing filters for seismic prospecting equipment it is desirable to provide for maintenance of a constant time delay for all frequencies passed by the filter. The reason for this is that if the time delay varies as the filter characteristics are changed, the seismic record will be in error as regards the arrival time of indicated reflections, thus necessitating the use of correction factors. Band-pass filter circuits heretofore designed for constant time delay, using either feedback amplifier circuits or the familiar lattice structure, have had the disadvantage that, in order to change the bandwidth of the filter, excessive amounts of switching and of substitution of filter elements were required.

It is one object of the present invention to provide a band-pass filter of variable bandwidth but with essentially constant time delay characteristics regardless of the bandwidth. Another object of the invention is to provide such a constant time delay filter whose bandwidth can be varied readily without the use of an undue number of filtering elements and without requiring excessive switching.

In accordance with this invention a variable bandwidth band-pass filter having essentially constant time delay is constructed by employing a series of narrow band-pass filter sections increasing in band-pass frequency through the series, adjacent sections overlapping in bandwidth but having essentially equal numerical bandwidth, and each section having substantially constant time delay for all frequencies within its pass band. Furthermore, each successive section bears such relation to the section immediately preceding that the Q (the reciprocal of the bandwidth) of each section is directly proportional to the peak frequency of that section. Means are provided for combining the outputs of adjacent filter sections so that the bandwidth of the filter can be varied simply by switching sections out of or adding sections to the group. Means are also provided for isolating each filter section from the adjacent sections with which it is combined.

In the preferred form of the invention each filter section comprises an amplifier stage having a peaked feedback. In order to set up the desired relationship between adjacent sections a null network is employed in the feedback loop of each of the feedback amplifiers. The null frequency determines the peak frequency of the stage and the Q of the stage is directly proportional to the gain of the stage. Thus in order to obtain linearity of the phase response it is necessary to increase the gain of each stage in direct proportion to the peak frequency of the stage or the null frequency of the feedback network. Since the gain of each stage differs, voltage divider action is used in order to keep the peak response of each peaked circuit constant with respect to the peak response of the other stages.

The nature and objects of this invention will be readily apparent from the ensuing description when read in conjunction with the accompanying drawing in which:

Fig. 2 is a schematic block diagram of a filter arrangement constructed in accordance with this invention and employed in conjunction with an amplifier circuit of a recording galvanometer for seismic prospecting;

Fig. 3 is a schematic diagram showing tuned resonant circuits that may be employed as components in the filter sections of Fig. 2;

Figure 4:
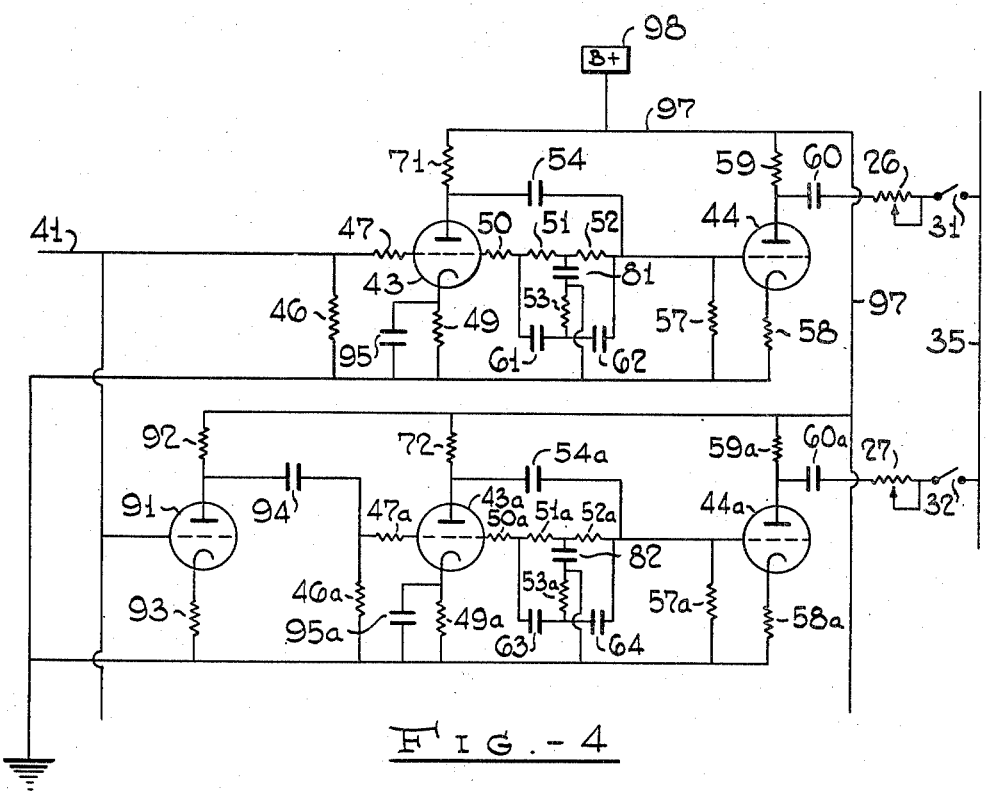
Fig. 4 is a circuit diagram depicting preferred representative examples of components of the block diagram of Figure 2.
Figure 6:
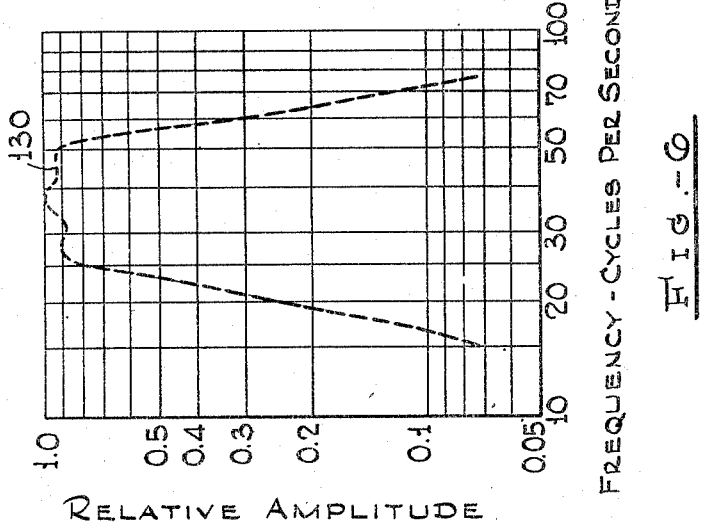
Figure 5:
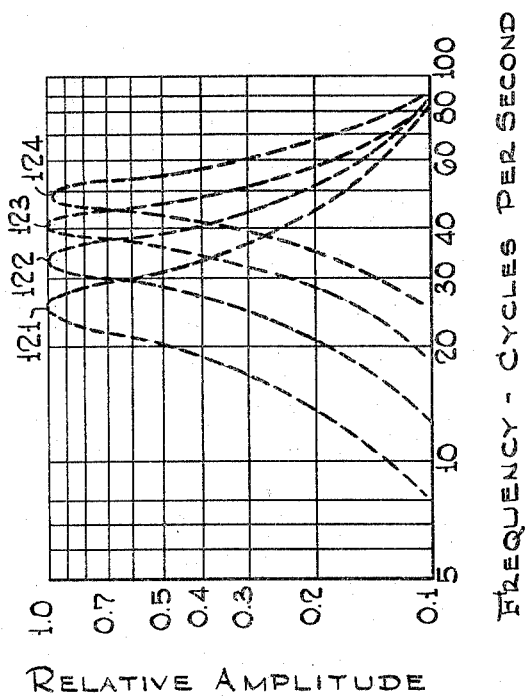
Figure 8:
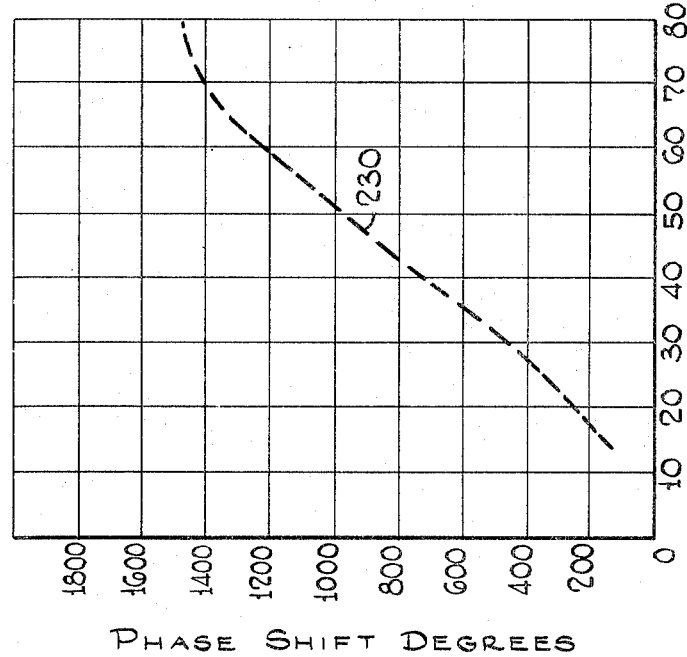
Figure 7:
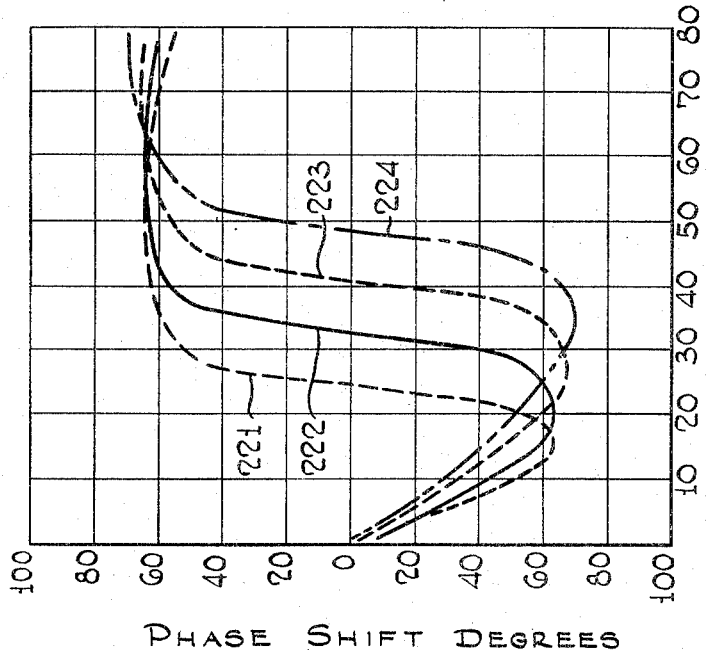

Figs. 5 and 6 are individual and combined amplitude response diagrams respectively, for four exemplary circuits arranged in parallel in the manner shown in Fig. 4; and Figs. 7 and 8 are phase response diagrams corresponding to Figs. 5 and 6 respectively.

Figure 1:
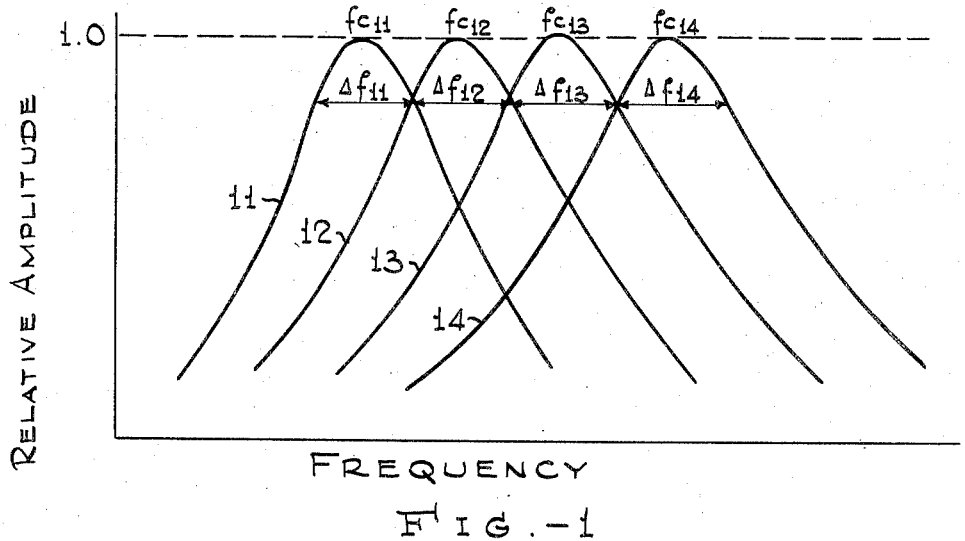
Fig. 1 is a graphical representation of the required relationship between adjacent circuits for proper operation of the invention.

In Fig. 1 are presented plots of relative amplitude versus frequency for each of a representative group of filter units arranged in parallel in accordance with the present invention. Response curves are shown for four circuits, for convenience, although any desired number of such circuits could be used. These curves are identified as lines 11, 12, 13 and 14 in the figure. The numerical bandwidths of the circuits are represented by symbols $\Delta f_{11}$, $\Delta f_{12}$, etc. and their peak frequencies by the symbols $f_{c11}$, etc.

As already stressed an important feature of this invention is that each successive section must bear such relation to adjacent sections that its Q value, which is the reciprocal of its percentage bandwidth, is directly proportional to its peak frequency.

By definition $1/Q = \Delta f/fc$ where $\Delta f$ is the numerical bandwidth and $fc$ is the peak frequency. Thus, $Q = fc/\Delta f$. If $\Delta f$ is held constant, as shown in Fig. 1, then Q is directly proportional to the peak frequency. If $\Delta f$ is held constant it can be shown that the slope of the phase curve through the interval of frequency $\Delta f$ will be the same for all circuits and thus the time delay for this interval will be constant.

A schematic block diagram of an arrangement providing the required relationship between sections is shown in Fig. 2, the arrangement being employed in conjunction with an amplifier circuit of a recording galvanometer for seismic prospecting. The output from a geophone 15 is fed to a first amplifier 16 whose output is connected in parallel to a plurality of filter sections 21, 22, 23 and 24. Only four such networks are shown although any number may be employed. Each of the networks has a sufficiently narrow pass band to provide essentially constant time delay for all frequencies within its pass band, so that if the Q of each of the networks is increased in direct proportion to its peak frequency then all of the parallel networks will have the same time delay, as was explained above. The maximum phase shift of each of the networks is only about 60° when employing peaked feedback amplifier filter networks and only about 90° when employing tuned resonant circuits. Hence a phase inverter 17 is placed in the input of every other one in the group of feedback amplifier networks, e. g. 22, 24, etc. The phase inverter 17 serves to add 180° of phase shift in order to fill in the gap in the phase curve which would otherwise result.

The outputs from the several parallel networks are connected through adjustable fixed resistors 26 to 29 and switches 31 to 34 to line 35 which feeds into the input of an additional amplifier network 101 and thence to a recording galvanometer 102.

Line 35 is tied to the common ground of the circuit through resistor 36, which, it will be seen, serves as the common resistor of a resistance mixing network. Amplifier 16 may be of any suitable design, its function being to amplify the incoming signal to a level suitable for recording on the seismograph. It may have an amplification factor of, say, 100 to 3000 and may be provided with time-variable gain control as is common practice in the seismic prospecting art. Amplifier 101 may have an amplification factor of about 300 to 500 and may be provided with an automatic gain control loop.

By suitable selection of switches 31 to 34 the outputs of the various networks 21 to 24 may be added together in any desired combination. It is essential, however, in order to obtain the benefits of this invention, that only adjacent networks be so connected. Thus the outputs of networks 21, 22 and 23, of 22, 23 and 24, of 21 and 22, etc. may be added together.

Each of the filter sections may simply comprise a tuned resonant circuit as illustrated schematically in Fig. 3, which depicts two such circuits representing sections 21 and 22 of Fig. 2. The input to each section is fed through resistor 37, representing the fixed resistor of a voltage divider. The resonant circuit comprises capacitor 38, inductance 39, and resistor 40 tied in parallel. The corresponding elements in the adjacent section are designated by the numerals 37a, 38a, etc., the input being fed through phase inverter 17. It is more practicable however, and hence preferred, in practicing the invention to employ peaked feedback amplifier-filter sections, particularly for seismic work.

Representative components of a portion of the block diagram of Figure 2 in which such amplifier-filter sections are utilized are shown in the circuit diagram of Figure 4, these components making up amplifier sections 21 and 22 and phase inverter 17. Each of the sections 21 and 22 is made up of a feedback filter circuit comprising an amplifier triode 43, 43a, etc. and a parallel T null network. The latter comprises resistors 51, 52 and 53 and capacitors 61, 62 and 81. An input voltage from line 40 is fed onto the grid of triode 43 through an isolating resistor 47. A similar isolating resistor 50 is inserted between the grid of triode 43 and the parallel T network just referred to. The plate of triode 43 is tied to a source of B+ potential 98 through plate load resistor 71. Grid resistor 46 and cathode bias resistor 49 are tied to ground, the latter resistor being arranged in parallel with cathode bypass capacitor 95 to furnish proper bias.

For isolating purposes the output from each of the parallel feedback circuits is fed into a buffer amplifier stage comprising a triode 44 and its associated cathode bias resistor 58, grid return resistor 57 and plate load resistor 59. The output from triode 43 is fed to the grid of the triode 44 through a coupling capacitor 54. The output of the buffer amplifier stage is fed to the resistance mixing network through a second coupling capacitor 60. In order that all of the parallel networks 21, 22 etc. will have the same amplitude at the peak frequency of the null, resistors 26, 27, etc. of the resistance mixing network are adjustable.

The elements comprising network 22 are similar to those of network 21; hence in Figure 4 triode 43a corresponds to triode 43, resistor 49a corresponds to the resistor 49, etc. However, the values for the capacitors in the parallel T networks of adjacent parallel circuits differ. For this reason these components are given different numerals in each circuit. Likewise since the plate load resistor for triode 43 differs from that for triode 43a etc., these resistors are numbered 71, 72, etc.

In a representative example of the four parallel networks, isolating resistors 47 and 50 may have resistance values of 2 megohms, grid resistors 46 and 57, resistance values of 3 megohms, cathode resistors 49 and 58 values of 3600 ohms and plate load resistor 59 a resistance of 0.24 megohm. Conveniently triode 43 and triode 44 may each constitute one-half of a 12AX7 double triode. Coupling capacitors 54 and 60 may have values of 0.5 microfarad, and cathode bypass capacitor 95 a value of 100 microfarads. Potential source 98 may be one furnishing +180 volts.

In the section representing network 22 the elements corresponding to those in the section representing network 21 are designated by the same reference numeral followed by the letter *a*. Those elements that differ in value are given different numbers. Thus, in order to establish the proper Q relation the plate load resistor and the capacitors in the parallel T sections differ. Assuming that four parallel sections are employed, although only two are shown in Figure 3, and assuming that the plate load resistors in the additional sections not shown would be designated by numerals 73 and 74, the resistors could be selected as follows:

| Section | Plate Load Resistor | Gain Factors | Calculated Resistances of Plate Resistors, ohms |
| --- | --- | --- | --- |
| 21 | 71 | 15 | 1,500 |
| 22 | 72 | 20 | 2,000 |
| 23 | 73 (not shown) | 25 | 3,000 |
| 24 | 74 (not shown) | 29 | 4,000 |

The calculated resistances in the above table are based on the assumption that 12AX7 triodes will be used.

Likewise in the parallel T networks the capacitors could be selected to give peak frequencies as shown in the following table:

| Section | Peak Frequency | Capacity of Capacitors 81, 82, etc. |
|---|---|---|
| | C. p. s. | Microfarad |
| 21 | 25 | 0.00634 |
| 22 | 33 | 0.00480 |
| 23 | 41 | 0.00386 |
| 24 | 49 | 0.00324 |

Capacitors 61 and 62 will each have one-half the capacity of capacitor 81, capacitors 63 and 64 will each have one-half the capacity of capacitor 82, etc., as is common in parallel T arrangements.

The phase inverter 17 of Figure 2 is made up in Figure 4 of a triode 91 with its associated cathode resistor 93 tied to ground and its plate load resistor 92 tied to the source of B+ potential 98 through line 97. An input voltage from line 41 is fed to the grid of triode 91. A coupling capacitor 94 ties the output of phase inverter 17 to the input of network 22. As a specific example triode 91 may comprise one half of a 12AX7 double triode, the other half being employed in the succeeding phase inverter stage, plate load resistor 92 and cathode resistor 93 may have resistance values of 100,000 ohms and 10,000 ohms, respectively, and coupling capacitor 94 a capacitance of 0.5 microfarad.

The amplitude response curves for four circuits having the components given in the foregoing example are depicted in Fig. 5 which shows a plot of relative amplitude versus frequency in cycles per second on a logarithmic scale. The curves for the circuits 21 to 24 are labeled 121 to 124 respectively. When the four circuits are combined in parallel the curve 130 shown in Fig. 6 is obtained. It will be noted that the overall response is characterized by sharp cutoff and slight ripples across the top of the characteristic.

It will be seen from Figure 5 that the four circuits of the specific example comply with the specified limitation that adjacent filter sections overlap in bandwidth. It will be noted further from Fig. 5 and from the second of the above tables that the four circuits also have the defined limitation of being of essentially equal numerical bandwidth since each section has a bandwidth of about eight cycles.

The phase response characteristics of the four individual circuits in the above example are shown in Fig. 7 which is a plot of phase shift versus frequency, the curves 221 to 224 representing sections 21 to 24 respectively. When these four circuits are combined in parallel the curve 230 shown in Fig. 8 is obtained. It will be noted that the phase response is essentially linear through the pass band, i. e. from about 15 to about 65 cycles.

Although in the specific example presented only four parallel circuits were shown it is to be understood that for practical purposes, e. g., for seismic work a minimum of six and preferably at least eight parallel circuits should be employed to obtain the desired characteristics over a response range of 20 to 100 cycles. As more parallel circuits are employed for a given overall response range, i. e. as the individual networks become narrower in pass band the better the phase response characteristics become. However economic considerations will obviously limit the number of individual networks employed.

It is to be understood that the scope of this invention is to be determined by the following claims and not merely by the specific embodiments described herein, which have been given by way of example only.

What is claimed is:

1. A variable bandwidth band-pass filter network comprising a series of narrow band-pass filter sections increasing in band-pass frequency through the series, each of said sections having a peak frequency, adjacent sections overlapping in bandwidth, the several sections being of essentially equal numerical bandwidth and each section having substantially constant time delay for all frequencies within its pass band, adjacent sections bearing such relation to each other that the Q of each section is proportioned to its peak frequency, means for combining the outputs of adjacent filter sections, means for isolating each filter section from the adjacent sections with which it is combined, means tying the inputs of the filter sections in parallel, and phase inversion means in the input of alternate adjacent sections.

2. Filter network according to claim 1 having at least six filter sections, the combined network being operable in a response range of 20 to 100 cycles.

3. Filter network according to claim 1 in which said filter sections comprise tuned resonant circuits.

4. Filter network according to claim 1 in which said means for combining the outputs of adjacent filter sections and said means for isolating each filter section from the adjacent sections with which it is combined comprises in combination a resistance mixing network consisting of a common outlet lead, a fixed resistor tying said outlet lead to ground, a plurality of individually operable switching means tied to said common outlet lead and a plurality of isolating resistors, one of said isolating resistors tying the output of each of said filter sections to said outlet lead through one of said individually operable switching means.

5. Filter network according to claim 1 in which each of said filter sections comprises an amplifier stage having a parallel-T null feedback network.

6. Filter network according to claim 5 including a buffer amplifier stage interposed between the output of each filter section and said means for combining the outputs of adjacent filter sections.

References Cited in the file of this patent

UNITED STATES PATENTS

| | | |
|---|---|---|
| 1,570,771 | Nyquist | Jan. 26, 1926 |
| 1,573,924 | Fletcher | Feb. 23, 1926 |
| 1,703,171 | Purington | Feb. 26, 1929 |
| 2,340,364 | Bedford | Feb. 1, 1944 |
| 2,417,069 | Farkas | Mar. 11, 1947 |
| 2,495,511 | Dolberg | Jan. 24, 1950 |